United States Patent [19]

Weeks et al.

[11] Patent Number: 5,208,835
[45] Date of Patent: May 4, 1993

[54] AUTOMATIC FREQUENCY CONTROL SYSTEM AND METHOD FOR FREQUENCY-SHIFT-KEY DATA TRANSMISSION SYSTEMS

[75] Inventors: Richard W. Weeks; Edward R. Eisenhauer, both of Laramie, Wyo.

[73] Assignee: In-Situ, Inc., Laramie, Wyo.

[21] Appl. No.: 586,804

[22] Filed: Sep. 24, 1990

[51] Int. Cl.⁵ .................. H04L 27/06; H04L 27/10
[52] U.S. Cl. .................................... 375/45; 375/97; 329/307; 332/100; 455/71
[58] Field of Search .............. 375/45, 79, 97, 81, 375/48, 62, 113, 120, 88, 89, 111; 329/307, 346; 332/100; 370/105.5, 105.4, 94.2, 94.1, 48; 455/71, 192, 208, 192.1-192.3, 182.2, 260, 75, 76; 331/1 R, 16; 340/825.58

[56] References Cited

U.S. PATENT DOCUMENTS

| 2,541,128 | 2/1951 | Violet | 178/66 |
|---|---|---|---|
| 4,606,049 | 8/1986 | Daniel | 375/45 |
| 4,649,551 | 3/1987 | Sander et al. | 375/81 |
| 4,651,104 | 3/1987 | Miyo | 328/139 |
| 4,807,254 | 2/1989 | Otani | 375/97 X |
| 4,835,790 | 5/1989 | Yoshida et al. | 375/97 X |
| 4,897,857 | 1/1990 | Wakatsuki et al. | 375/88 |
| 4,955,083 | 9/1990 | Phillips et al. | 375/77 X |

FOREIGN PATENT DOCUMENTS

0260788A2 3/1988 European Pat. Off.
2601533A1 1/1988 France.
58-073247 2/1983 Japan.

*Primary Examiner*—Curtis Kuntz
*Assistant Examiner*—Tesfaldet Bocure
*Attorney, Agent, or Firm*—Sheridan Ross & McIntosh

[57] ABSTRACT

The present invention provides a system and method of automatic frequency control (AFC) in a frequency-shift-key (FSK) data transmission system that allows a receiver to be used that has a bandwidth that approaches the requisite minimum bandwidth for a given data transmission rate and produces a substantial signal noise ratio (SNR) in the detected signal by the receiver. The invention includes a transmitter that outputs a SPACE signal and a MARK signal in a preamble that precedes the transmission data. The apparatus also includes a receiver that uses the SPACE and MARK signals to adjust the frequency of the signal output by a voltage-controlled-oscillator (VCO) to tune the receiver and thereby improve the signal-to-noise ratio (SNR) in the signals subsequently detected by the receiver.

22 Claims, 4 Drawing Sheets

AUTOMATIC FREQUENCY CONTROL SYSTEM AND METHOD FOR FREQUENCY-SHIFT-KEY DATA TRANSMISSION SYSTEMS

BACKGROUND OF THE INVENTION

1. Field of the Invention

The present invention provides a system and method for performing automatic frequency control (AFC) in a Frequency-shift-key (FSK) data transmission system that allows a receiver to be used that has a bandwidth that approaches the minimum bandwidth for a given data transmission rate and, as a consequence, allows a substantial signal-to-noise ratio (SNR) to be realized in the signal detected by the receiver.

2. Description of the Related Art

A method that is widely used to transmit binary data is the frequency-shift-key (FSK) method. In the FSK method, an FSK transmitter modulates the frequency of a carrier signal between two predetermined frequencies according to the logical state, logical "0" or logical "1", of a binary data signal to produce an FSK signal. For convenience, the portions of the FSK signal corresponding to a logical "0" and a logical "1" in the binary data signal are hereinafter referred to as a SPACE and a MARK, respectively.

As in all data transmission systems, a minimum bandwidth is required in an FSK data transmission system in order to accurately transmit binary data. The minimum bandwidth required in the receiver of an FSK data transmission system is defined by the following equation:

$$FSK_{min\ bw} = B + \Delta f \quad (1)$$

where B is the baseband bandwidth, which is the data transmission rate or frequency of the binary data, and $\Delta f$ is the frequency deviation. If the bandwidth of the receiver in an FSK data transmission system is less than the minimum bandwidth, then the receiver cannot reliably recover the binary data in the FSK signal output by the transmitter. If, on the other hand, the bandwidth in the receiver of an FSK data transmission system is greater than the minimum bandwidth, then noise can adversely affect the performance of the system by reducing the signal-to-noise ratio (SNR) of the binary data signal detected or recovered by the receiver. An FSK data transmission system where the bandwidth of the receiver is at or near the minimum bandwidth is less susceptible to noise and, as a consequence, the signal detected by the receiver has a higher SNR. Based on the foregoing, it can be seen that there is an optimum bandwidth for an FSK data transmission system, the minimum bandwidth set forth in equation (1), that is broad enough to adequately transmit binary data but narrow enough to substantially reduce or minimize the adverse effects of noise.

The bandwidth of most FSK receivers is established in the design of the intermediate frequency (i.f.) filter or filters that process the signal output by a mixer, a device that converts the frequency of the signal received by the receiver to a lower frequency. Consequently, in designing an FSK data transmission system, the required data transmission rate is determined, the minimum necessary bandwidth is calculated using equation (1), and an i.f. filter or series of filters is designed that has at least the minimum bandwidth. Conventionally, the midpoint of the i.f. filter bandwidth is termed the i.f. frequency.

The signal output by the mixer is termed the i.f. signal and has a frequency that is equal to the difference between the frequency of the received signal and the frequency of the signal output by a local voltage controlled oscillator (VCO). To avoid confusion between the frequency of the i.f. signal output by the mixer and the i.f. frequency of the i.f. filter, the i.f. frequency of the i.f. filter is hereinafter referred to as the center frequency of the i.f. filter. The frequency of the i.f. signal can be determined by the following equation:

$$f_{IF} = f_{TX} - f_{VCO} \quad (2)$$

where $f_{IF}$ is the frequency of the i.f. signal output by the mixer, $f_{TX}$ is the frequency of the signal output by the transmitter, and $f_{VCO}$ is the frequency of the signal output by the VCO.

To recover the binary data in an FSK data transmission system, the receiver must be tuned to the transmitter by adjusting the frequency of the signal output by the VCO so that the frequency spectrum of the i.f. signal output by the mixer is substantially symmetrical about the center frequency of the i.f. filter. If the receiver is tuned, then the SNR of the signal detected by the receiver will increase as the bandwidth of the receiver approaches the minimum bandwidth necessary for a given data transmission rate.

A high SNR is extremely desirable in situations where data must be transmitted and/or received in environments where the transmitted signal is subjected to a high degree of noise. To achieve a high SNR, the receiver must have a bandwidth at or near the minimum bandwidth and the receiver must be precisely tuned. This allows the receiver to recover the binary data while at the same time substantially reducing the adverse effects of noise. Unfortunately, the frequency of the carrier signal output by the transmitter, the frequency of the signal output by the VCO, or both are likely to drift due to changes in temperature and the like. To compensate for drift in the transmitter carrier frequency, the frequency of the signal output by the VCO, or both, the receiver is typically equipped with automatic frequency control (AFC) circuitry that automatically tunes the receiver to the transmitter, i.e., adjusts the frequency of the signal output by the VCO such that the spectrum of the signal output by the mixer is substantially symmetrical about the center frequency of the i.f. filter.

One method of achieving automatic frequency control is to continuously tune the receiver using a feedback signal that reflects the difference in frequency between the signal being output by the transmitter and the frequency to which the receiver is tuned. More specifically, this method involves continuously comparing the frequency of the signal being output by the transmitter with the frequency to which the receiver is tuned to generate a difference signal, continuously averaging the difference signal over a short period of time, and then tuning the receiver such that the average of the difference signal, which is typically obtained at the output of the receiver's detector, tends toward zero. This method works well with an analog data signal, like speech or music, where the average value of the data signal is close to zero and, as a consequence, the average frequency of the signal output by the transmitter is at or near the carrier frequency. Since the average frequency of the signal output by the transmitter is at or near the carrier frequency, the frequency of the signal output by the VCO can be adjusted by the AFC so that the spectrum of the i.f. signal is substantially symmetrical about the center frequency of the i.f. filter and, as a consequence, substantially all of the data can be recovered. However, this method does not work well with binary data signals that often exhibit a dc component, due to a number of consecutive logical "1"'s or logical "0"'s over a defined time period, because the average frequency of the signal output by the transmitter over the defined time period is greater than or less than the carrier frequency by an amount that reflects the dc component of the binary signal. Due to the dc component, the AFC adjusts the frequency of the signal output by the VCO such that the spectrum of the i.f. signal output by the mixer is not substantially symmetrical about the center frequency of the i.f. filter and, as a consequence, adversely affects the recovery of the modulation signal by the receiver. Typically, this problem is addressed by adding "balancing" SPACEs or MARKs to eliminate the dc component in the binary data signal. This solution, however, reduces the transmission rate of the meaningful data and in so doing substantially nullifies the benefits of using a receiver with a bandwidth at or near the minimum bandwidth, i.e., a high SNR.

Another method of accomplishing automatic frequency control that is used in packet FSK data transmission systems where data is generally transmitted in bursts or packets of predetermined lengths involves transmitting an unmodulated carrier signal at the beginning of each packet in what is typically known as a preamble. The receiver, upon receiving the preamble, activates a feedback loop that utilizes the difference in the frequency of the carrier signal output by the transmitter and the frequency to which the receiver is tuned to generate a difference signal that is used to tune the receiver during the transmission of the data contained in the remainder of the packet. An example of this method of obtaining automatic frequency control in a phase-shift-key data transmission system is shown in U.S. Pat. No. 4,651,104, which issued on Mar. 17, 1987 to Miyo for a "Frequency Converter with Automatic Frequency Control". While this method of automatic frequency control allows a receiver to be utilized that has a bandwidth that approaches the minimum necessary bandwidth for a given data transmission rate and achieve a substantial signal to noise ratio, it has several drawbacks. Among the drawbacks, this method requires that the transmitter incorporate additional circuitry to generate the unmodulated carrier frequency that is transmitted during the preamble of a packet. Typically, FSK data transmission systems only incorporate the circuitry required to generate the SPACE signal and the MARK signal. Consequently, the need to include circuitry for transmitting the unmodulated carrier signal significantly adds to the cost of FSK data transmission systems that employ this method of achieving automatic frequency control. Another drawback associated with this method of achieving automatic frequency control in FSK data transmission systems is that the transmitter must be aligned such that the frequency of the SPACE signal and the frequency of the MARK signal are symmetrical about the frequency of the carrier signal. Otherwise, this method of AFC may detune the receiver and, in so doing, reduce the reliability of the FSK data transmission system. Moreover, the need to accurately align the transmitter adds significant manufacturing costs to an FSK data transmission system.

Based on the foregoing, there is a need for a system and method of achieving automatic frequency control in an FSK data transmission system that allows a receiver with a bandwidth that approaches the minimum bandwidth for a given data transmission rate to be utilized, realizes a high SNR, and also addresses the failings in the known art discussed hereinabove. Specifically, there is a need for a system and method of providing AFC in an FSK data transmission system that allows a receiver with a bandwidth that approaches the minimum required bandwidth for a given data transmission rate to be utilized and produces a high SNR but does not require any circuitry in the transmitter to generate an unmodulated carrier signal. Moreover, there is a need for a system and method of providing automatic frequency control in an FSK data transmission system that allows a receiver with a bandwidth that comes near to the minimum bandwidth required for a defined data transmission rate to be used and produces a high SNR but does not require the frequencies associated with the SPACE and MARK portions of the signal output by the transmitter to be symmetrical about the frequency of the carrier signal. Additionally, there is a need for an automatic frequency control system and method in an FSK data transmission system that permits a receiver with a bandwidth that tends toward the minimum bandwidth required for the data transmission rate to be employed and provides a high SNR without reducing the data transmission rate of the meaningful data by using "balancing" SPACES and MARKS to compensate for the dc component typically associated with the binary data signals employed in an FSK data transmission system.

SUMMARY OF THE INVENTION

The present invention provides an automatic frequency control system and method for an FSK data transmission system that allows a receiver to be utilized that has a bandwidth that approaches the minimum bandwidth required for a particular data transmission rate and produces a high SNR. Due to the high SNR, an FSK data transmission system that incorporates the automatic frequency control system and method of the present invention can be used to reliably transmit data in high noise environments. For example, the United States government is in the process of requiring all gasoline stations to monitor their buried gasoline tanks for leaks that may allow gasoline or gasoline vapors to escape and contaminate the surrounding ground and/or ground water. Reliable transmission of data using an FSK data transmission system in the gasoline station environment requires a substantial signal to noise ratio due to the high level of noise generated by car engines, pumps, radios, and the like. An FSK data transmission system that includes the automatic frequency control of the present invention is capable of achieving the SNR required by this application.

The AFC apparatus of the present invention includes a transmitter that broadcasts a preamble having a SPACE portion and a MARK portion. The AFC apparatus also includes a receiver that uses the SPACE and MARK portions of the preamble output by the transmitter to tune the receiver to the transmitter. More specifically, in a preferred FSK embodiment of the AFC apparatus, the SPACE and MARK portions of the preamble are used to adjust the frequency of a signal output by a voltage controlled oscillator so that when signal output by the voltage controlled oscillator is mixed with the signal received by the receiver the spectrum of the resulting i.f. signal is symmetrical about the center frequency of the receiver, which preferably has a bandwidth that approaches the minimum necessary bandwidth for a defined data transmission rate so that a high SNR can be achieved. In other words the receiver is tuned to the transmitter. The receiver can now operate under substantially optimum bandwidth conditions, i.e., substantially all of the binary data can be recovered while also substantially reducing the adverse effects of noise. Moreover, the receiver is tuned regardless of whether the transmitter, VCO, or both are initially detuned. Tuning also occurs regardless of whether or not the transmitter is misaligned, i.e., the frequencies associated with the SPACE and MARK are not symmetrical about the carrier frequency.

Operation of the aforementioned preferred FSK embodiment of the invention commences with the transmitter outputting the SPACE and MARK portions of the preamble. The receiver, upon detecting the preamble, "down-mixes" the received signal using the signal being output by the voltage controlled oscillator. At this point, the signal output by the voltage controlled oscillator has not been adjusted to tune the receiver to the transmitter. The "down-mixed" signal is then processed by a detector to recover the logical "0" and logical "1" binary data signals that correspond to the SPACE signal and the MARK signal associated with preamble broadcast by the transmitter. The level of the logical "0" signal is related to the difference in frequency between the SPACE signal of the preamble broadcast by the transmitter and the frequency of the signal output by the voltage controlled oscillator. Similarly, the level of the logical "1" signal is related to the difference in frequency between the MARK signal of the preamble broadcast by the transmitter and the signal output by the voltage controlled oscillator. The logical "0" and logical "1" signals are used to tune the receiver such that the spectrum of the i.f. signal of the subsequently received data is substantially symmetrical about the center frequency of the receiver. The AFC circuitry in the receiver accomplishes this by sampling-and-holding the levels of the aforementioned logical "0" and logical "1" recovered by the detector, averaging the sampled-and-held signals, scaling the resulting average signal, and applying the resulting signal to the voltage controlled oscillator to adjust the frequency of the signal output by the voltage controlled oscillator. The signal applied to the VCO reflects the difference in frequency between the signal output by the VCO and the frequency midway between the frequencies associated with the SPACE and MARK portions of the preamble. This difference, in turn, reflects the difference between the center frequency of the receiver and the frequency midway between the frequencies of the SPACE and MARK portions of the preamble following the mixing operation. Consequently, the signal applied to the VCO changes the frequency of the signal output by the VCO such that the difference between the center frequency of the receiver and the frequency midway between the frequencies of the SPACE and MARK portions of the preamble following mixing approaches zero. This, in effect, adjusts the frequency of the signal output by the VCO such that the spectrum of the i.f. signal is substantially symmetrical about the center frequency of the receiver and thereby allows data to be reliably recovered while at the same time substantially reducing the adverse effects of noise. In the preferred embodiment of the invention, the automatic frequency control system does not operate to adjust the frequency of the signal output by the voltage controlled oscillator unless a predetermined signal strength is detected by the receiver.

Based on the foregoing, the present invention provides an AFC system and method that allows a receiver with a bandwidth that tends toward the minimum bandwidth for a given data transmission rate to be utilized and a high SNR achieved while also exhibiting several advantages over the known art. Namely, the automatic frequency control system and method of the present invention can be used with an FSK data transmission system without having to add "balancing" SPACES and MARKS to compensate for a dc component in the binary signal. Moreover, the AFC system and method of the present invention does not require the transmitter to include any special circuitry for generating signals other than the SPACE and MARK signals normally output by an FSK system. Additionally, the AFC system and method of the present invention does not require the transmitter to be constructed such that the frequencies of the SPACE and MARK signals are substantially symmetrical about the frequency of the transmitter's carrier signal. Stated another way, the AFC system and method of the present invention is insensitive to the relationship between the frequencies of the SPACE signal, MARK signal and carrier signal used by the transmitter.

DETAILED DESCRIPTION OF THE PREFERRED EMBODIMENT

The present invention provides an automatic frequency control system and method for an FSK data transmission system that allows a receiver to be utilized with a bandwidth that approaches the minimum bandwidth required for a given data transmission rate and also achieve a high SNR. The present invention includes a transmitter for outputting a SPACE signal and a MARK signal in a preamble that precedes the transmission of user data. In addition to the transmitter, the invention includes a receiver that uses the SPACE and MARK signals output by the transmitter to tune the receiver and thereby reliably recover the binary data signals that are output by the transmitter following the transmission of the preamble containing the SPACE and the MARK and also substantially reducing or minimizing the effects of noise.

Figure 1:
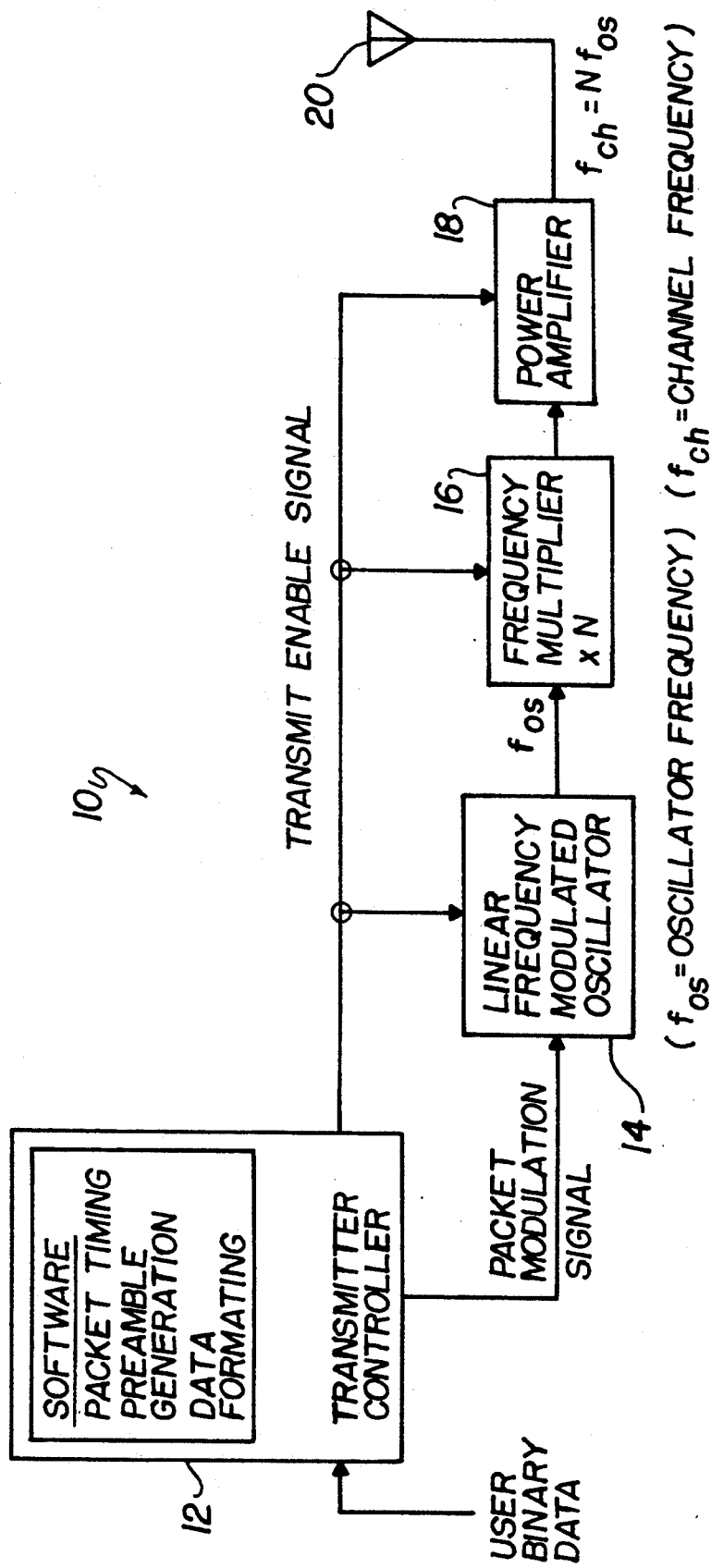
FIG. 1 is a block diagram of an FSK transmitter that is used in a preferred embodiment of the invention.

With reference to FIG. 1, a preferred embodiment of the invention includes an FSK transmitter 10, hereinafter transmitter 10, for outputting a packet FSK signal where the frequency of a carrier signal is modulated between two predetermined frequencies according to the logical state, logical "0" or logical "1", of a packet modulation signal that includes a preamble portion and a user data portion.

The FSK transmitter 10 includes a controller 12 for generating the preamble portion, receiving the user data portion from a device that outputs a binary data signal, and combining the preamble portion with the user data portion to generate the packet modulation signal that is used to modulate the carrier signal. The controller 12 also controls the enablement of other components that comprise the transmitter 10. Preferably, functions such as the generation of the preamble portion of the packet modulation signal and combining the preamble portion with the user data portion are accomplished using software located in the controller 12.

Also included in the transmitter 10 is a linear frequency modulated oscillator 14 that outputs a carrier signal whose frequency is modulated between two predetermined frequencies according to the logical state of the packet modulation signal output by the controller 12. Operation of the linear frequency modulated oscillator 14 is enabled by the transmitter controller 12.

The transmitter 10 also includes a frequency multiplier 16 for increasing the frequency of the FSK modulated carrier signal output by the linear frequency modulated oscillator 14 to a suitable radio transmission frequency. A variety of radio frequency bands are feasible. Like the linear frequency modulated oscillator 14, operation of the frequency multiplier is enabled by the controller 12.

Also included in the transmitter 10 is a power amplifier 18 which amplifies that FSK packet radio signal output by the frequency multiplier 16 for broadcasting by a transmitting antenna 20. The operation of the power amplifier 18 is enabled by the controller 12.

Figure 2:
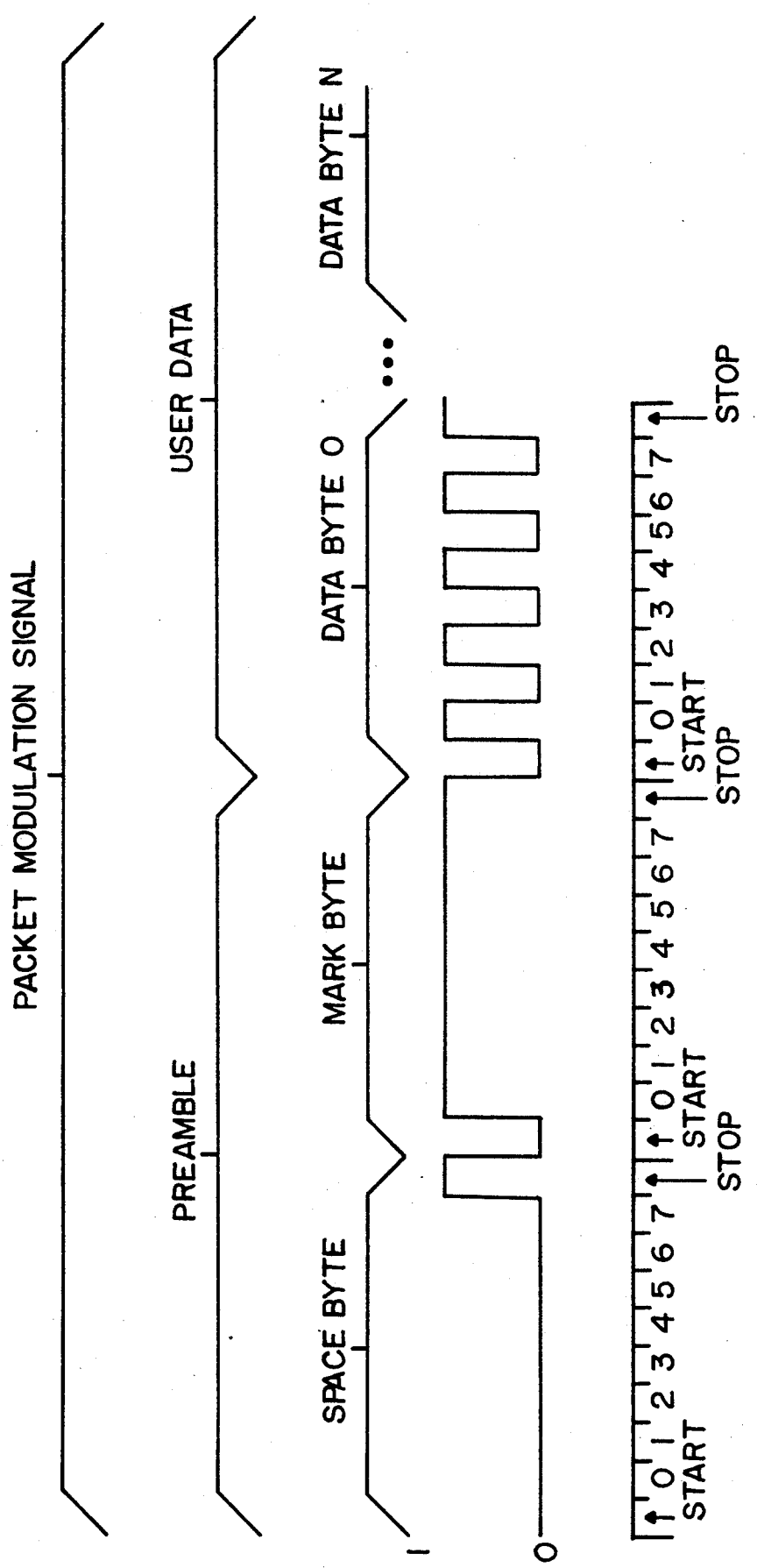
FIG. 2 illustrates the modulation signal used by the transmitter shown in FIG. 1 to FSK modulate a carrier signal.

With reference to FIG. 2, the preferred embodiment of the packet modulation signal output by the controller 12 is illustrated. The packet modulation signal includes a preamble portion and a user data portion. The preamble portion includes a SPACE byte and a MARK byte. The SPACE byte includes a start bit, eight bits at a logical "0" level, and a stop bit. Similarly, the MARK byte includes a start bit, eight bits at a logical "1" level, and a stop bit. The user data portion is generally comprised of a known number of data bytes where each data byte includes a start bit, eight data bits, and a stop bit. By convention, the aforementioned start and stop bits are at logical "0" and "1" levels, respectively. Similarly, a SPACE bit or byte conventionally refers to a logical "0" level signal and a MARK bit or byte conventionally refers to a logical "1" level signal. The aforementioned conventions can, of course, be altered or modified according to the requirements of the particular application in which the invention is utilized. Moreover, the aforementioned bytes can be replaced with data structures of other lengths, like nibbles and words.

Figure 3:
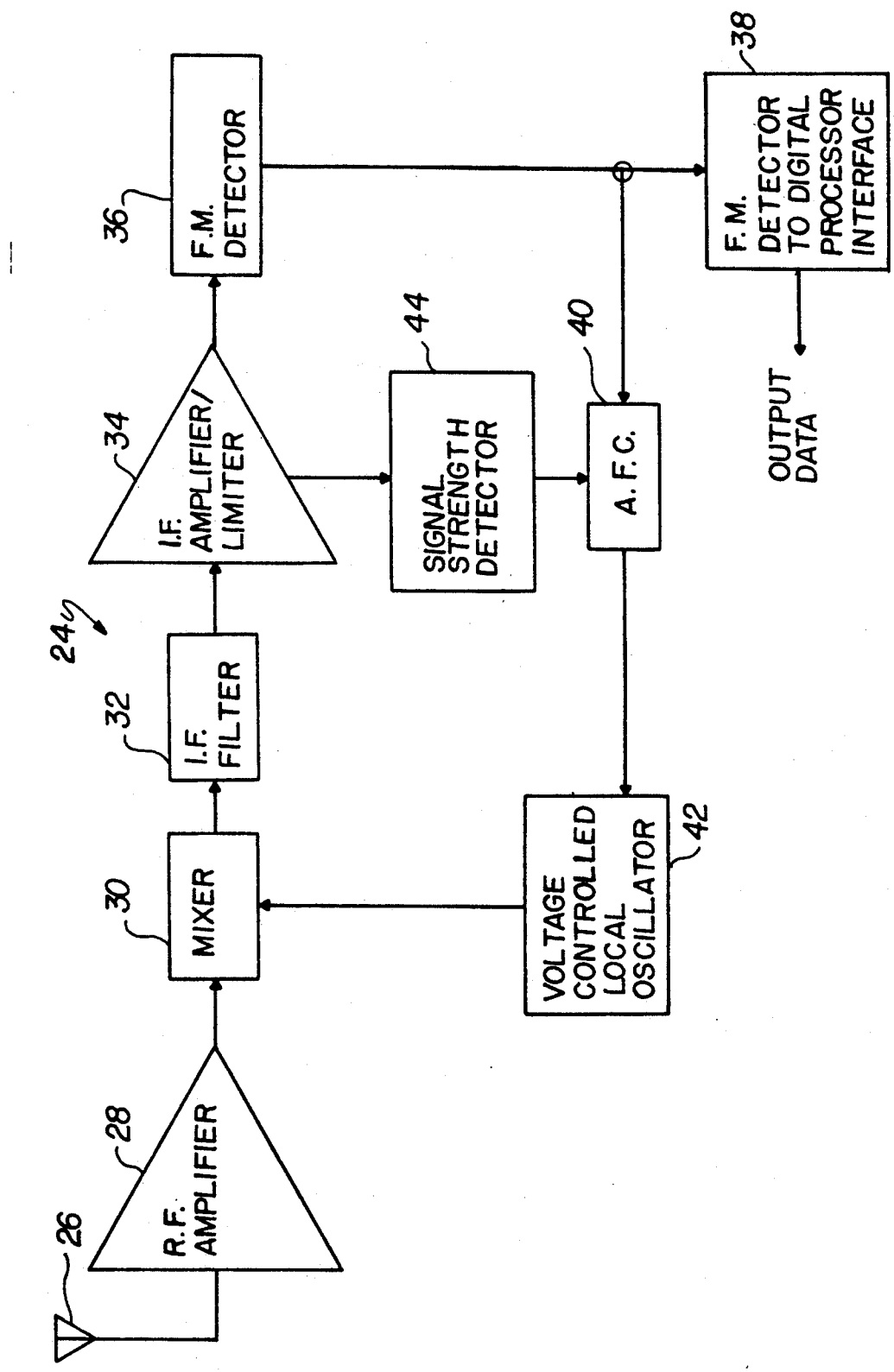
FIG. 3 is a block diagram of an FSK receiver that is used in a preferred embodiment of the invention.

With reference to FIG. 3, an FSK receiver 24, hereinafter receiver 24, is illustrated. The receiver 24 includes a receiving antenna 26 and a RF amplifier 28 for receiving the FSK packet radio signal broadcast by the transmitter 10 and amplifying the received signal, respectively.

Further included in the receiver 24 is a mixer 30 for combining the FSK packet radio signal with a signal from a voltage controlled oscillator to convert the FSK oscillator radio packet signal to an i.f. signal. The FSK receiver 24 also includes an intermediate frequency (i.f.) filter 32. Preferably, the i.f. filter 32 has a bandwidth that approaches the minimum necessary bandwidth as determined by the data transmission rate of the packet modulation signal and set forth in equation (1). The bandwidth of the i.f. filter 32 is also symmetrical about a defined center frequency, 455 kHz in a preferred embodiment of the invention. The i.f. filter 32 operates to filter out substantially all of the signals outside of its bandwidth while passing the signal output by the mixer 30. If the i.f. signal output by the mixer 30 does not have a frequency spectrum that is symmetrical about the center frequency of the i.f. filter, then the ability of the receiver to recover the packet modulation signal is adversely affected. Also included in the receiver 24 is an intermediate (i.f.) amplifier/limiter for amplifying the signal output by the i.f. filter 32 until a defined amplitude limit is reached.

A FM detector 36 is also included in the receiver 24 to recover the packet modulation signal by converting the signal output by the i.f. amplifier/limiter 34 to a voltage that is proportional to the instantaneous frequency of the signal output by the i.f. amplifier/limiter 34, which is the difference in frequency between the signal output by the transmitter and the frequency of the signal output by a VCO.

An interface circuit 38 is used to condition the recovered packet modulation signal output by the FM detector 36 for use by other processing hardware. Generally, the interface circuit 38 converts the output of the FM detector to a form that has the appropriate voltage levels for digital processing.

The receiver 24 further includes automatic frequency control circuitry 40, hereinafter referred to as AFC circuitry 40, that utilizes the preamble portion of the recovered packet modulation signal output by the FM detector 36 to adjust the frequency of the signal output by a voltage controlled oscillator 42, hereinafter referred to as VCO 42, such that the spectrum of the i.f. signal output by the mixer 30 is substantially symmetrical about the center frequency of the i.f. filter 32, which preferably has a bandwidth that approaches the minimum necessary bandwidth required for the data transmission rate of the packet modulation signal, to allow the recovery of the packet modulation signal while also substantially reducing the adverse effects of noise and thereby achieving a high signal to noise ratio when the user data portion is recovered by the FM detector 36.

A signal strength detector 44 is used to activate the AFC circuitry 40 when a preamble having an adequate amplitude for the receiver 24 to function in an acceptable manner is received. The signal strength detector 44 operates based upon a signal output by the i.f. amplifier/limiter 34.

Figure 4:
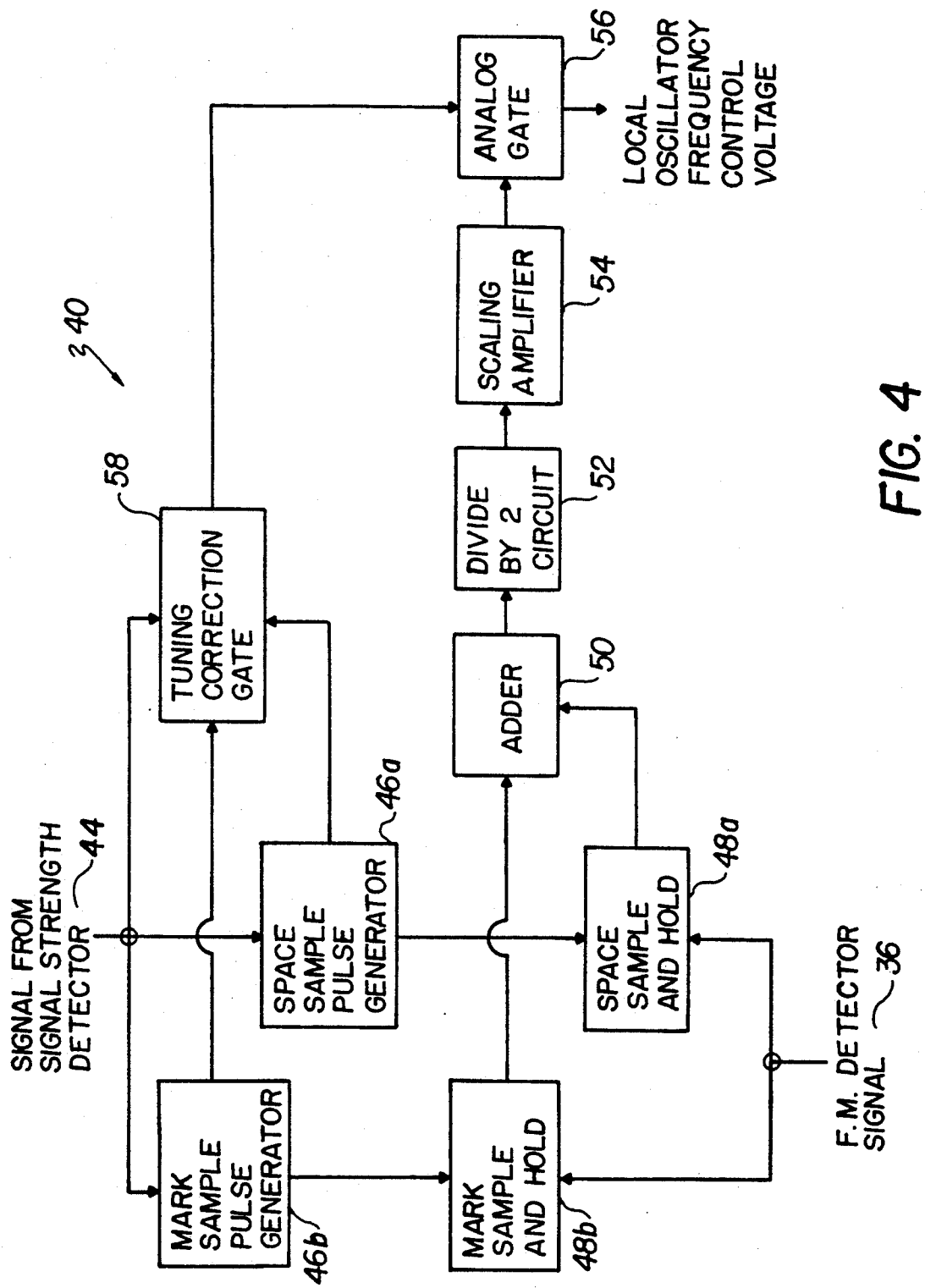
FIG. 4 is a detailed block diagram of the AFC portion of the receiver illustrated in FIG. 3.

FIG. 4 provides a more detailed diagram of the AFC circuitry 40. The AFC circuitry 40 includes a SPACE sample pulse generator 46a and a MARK sample pulse generator 46b that generate a SPACE sample pulse and a MARK sample pulse, respectively, in response to the detection of a preamble of adequate signal strength by the signal strength detector 44. The signal output by the signal strength detector 44 that is used to activate the AFC circuitry 40 is timed to coincide with the recovery of the preamble portion of the packet modulation signal by the FM detector 36. In operation, the SPACE sample pulse generator 46a produces the SPACE sample pulse at approximately the center of the time during which the SPACE byte of the packet modulation signal is being recovered by the detector 36. Similarly, the MARK sample pulse generator 46b generates the MARK sample pulse at approximately the center of the time during which the MARK byte of the packet modulation signal is being recovered by the FM detector 36. Stated another way, the SPACE sample pulse generator 46a and the MARK sample pulse generator 46b produce their respective sample pulses to coincide with the times when the FM detector 36 is recovering the SPACE byte and the MARK byte, respectively, of the preamble portion.

The AFC circuitry 40 also includes a SPACE sample-and-hold circuit 48a and a MARK sample-and-hold circuit 48b that sample and hold, for the duration of the packet, the voltage level of the 8-bit portions of the SPACE byte and MARK byte, respectively, as they are output by the FM detector 36. An adder circuit 50 and a divide-by-two circuit 52 are used to determine the average voltage level of the signals held by the SPACE sample-and-hold 48a and the MARK sample-and-hold 48b. A scaling amplifier 54 scales the average signal output by the divide-by-two circuit 52 for application to the VCO 42.

The AFC circuitry 40 further includes an analog gate 56 for use in preventing the scaled, average signal produced by the scaling amplifier 54 from being applied to the VCO 42 until the signal output by the signal strength detector 44 has been detected and both the SPACE byte and the MARK byte of the preamble portion have been sampled. A tuning correction gate 58 is included in the AFC circuit 40 for controlling the analog gate 56. In operation, the tuning correction gate 58 opens the analog gate 56 and allows the scaled, average signal at the output of the scaling amplifier 54 to be applied to the voltage controlled oscillator 42 only after detecting the signal output by the signal strength detector 44 followed by the SPACE sample pulse and the MARK sample pulse produced by the SPACE sample pulse generator 46a and the MARK sample pulse generator 46b, respectively. If the tuning correction gate 58 has not received all of the aforementioned signals, then it inhibits the scaled, average signal at the output of the scaling amplifier 54 from being applied to the voltage controlled oscillator 42 by keeping the analog gate 56 closed.

The scaled, average signal at the output of the scaling amplifier 54 that is applied to the VCO 42 is the voltage necessary to adjust the frequency of the signal output by the VCO 42 such that the receiver 24 is tuned, i.e., the spectrum of the i.f. signal output by the mixer 30 is substantially symmetrical about the center frequency of the filter 34 to allow for the recovery of the user data portion of the packet modulation signal while also substantially reducing the adverse effects of noise. The scaled, average signal that is applied to the VCO 42 is typically called the VCO correction voltage and can be mathematically represented as follows:

$$V_c = (K_1 K_2 (f_m - f_{VCO}) + K_1 K_2 (f_s - f_{VCO}))/2 \qquad (3)$$

$$V_c = K_1 K_2 ((f_m + f_s)/2 - f_{VCO}) \qquad (4)$$

where $V_c$ is the VCO correction voltage, $f_s$ is the frequency of the SPACE signal in the preamble, $f_m$ is the frequency of the MARK signal in the preamble, $f_{VCO}$ is the frequency of the signal output by the VCO 42, $K_1$ is the frequency to voltage conversion constant of the detector 36, and $K_2$ is the scaling constant of the scaling amplifier 54.

Operation of the illustrated embodiment of the invention commences when user binary data is applied to the controller 12 of the transmitter 10. The controller 12, in response to the application of user binary data, assembles the packet modulation signal. More specifically, the controller generates, preferably in software, the preamble portion of the packet modulation signal and adds the required start and stop bits of the user binary data to establish the user data portion of the packet modulation signal. In addition, the controller 12 enables the linear frequency modulated oscillator 14, frequency multiplier 16, and power amplifier 18. Once the aforementioned components are enabled the controller applies the packet modulation signal to the linear frequency modulated oscillator 14. The output of the linear frequency modulated oscillator is then processed by the frequency multiplier 16 and power amplifier 18 to produce an FSK packet radio signal that is broadcast via the transmitting antenna 20.

The FSK packet radio signal is received by the reception antenna of the receiver 24 and amplified by the r.f. amplifier 28.

Initially, the frequencies of the SPACE and MARK portions of the preamble portion of the FSK packet radio signal are each converted to a lower frequency using the mixer 30, which combines the SPACE and MARK portions with the signal being output by the VCO 42. The down-converted preamble portion of the FSK packet radio signal output by the mixer 30 is then applied to the i.f. filter 32 and amplifier/limiter 34 which amplifies the preamble portion of the down-converted signal up to a defined limit. If the preamble portion of the down-converted signal is of a sufficient strength the signal strength detector 44 activates the AFC 40.

Once the AFC 40 is activated, the SPACE sample pulse generator 46A and the MARK sample pulse generator 46B cause the level of the SPACE and MARK bytes of the preamble being recovered by the FM detector 36 to be sampled and held by the SPACE sample-and-hold 48A and the MARK sample-and-hold 48B, respectively. The level of the signal held by the SPACE sample-and-hold 48A reflects the difference between the frequency associated with the SPACE portion of the FSK packet radio signal and the frequency of the signal being output by the VCO 42. Similarly, the signal held by the MARK sample-and-hold 48A reflects the difference between the frequency of the MARK portion of the FSK packet radio signal and the frequency of the signal being output by the VCO 42. The signals held by the SPACE sample-and-hold 48A and MARK sample-and-hold 48B are averaged by the adder 50 and divide-by-2 circuit 52. The resulting signal is then scaled by the scaling amplifier 54. The voltage signal at the output of the scaling amplifier 54 reflects the difference between the frequency midway between the frequencies associated with SPACE and MARK portions of the preamble portion of the FSK packet radio signal and the frequency of the signal being output by the VCO 42 as described in equation 4. This in turn, reflects the extent to which the frequency spectrum of the i.f. signal output by the mixer 30 is not symmetrical about the center frequency of the i.f. filter.

Once the tuning correction gate 58 has received the aforementioned signal from the signal strength detector 44 and confirmed that the SPACE and MARK bytes of the preamble have been sampled, it allows the VCO correction signal existing at the output of the scaling amplifier 54 to be applied to the VCO 42 by opening the analog gate 56. Otherwise the tuning correction gate 58 inhibits application of the scaled average signal to the VCO 42 by keeping the analog gate 56 closed. In response to the VCO correction signal from the analog gate 52, the VCO 42 adjusts the frequency of its output signal so that the frequency spectrum of the i.f. signal output by the mixer 30 when it mixes the signal output by the VCO 42 with the received signal is symmetrical about the center frequency of the i.f. filter 32. By adjusting the frequency of the signal output by the VCO in this manner, the receiver 24 can recover the packet modulation signal while also substantially reducing the adverse effects of noise and thereby produce a high SNR.

The foregoing description of the invention has been presented for purposes of illustration and description. Further, the description is not intended to limit the invention to the forms disclosed herein. Consequently, variations and modifications commensurate with the above teachings and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. An automatic frequency control system for a frequency shift key (FSK) data transmission system, comprising:
    means for transmitting an FSK signal that includes a first FSK signal that has a first frequency, a second FSK signal that has a second frequency which is different than said first frequency of said first FSK signal, and an FSK user data signal, wherein said first and second FSK signals are at predetermined locations in said FSK signal; and
    means for receiving said FSK signal and using said first and second frequencies of said first and second FSK signals to adjust the frequency of a signal that is output by an oscillator and that is mixed with said FSK signal to convert said FSK signal to a lower frequency spectrum, wherein the adjustment of the frequency of said signal tunes said means for receiving for said FSK user data signal that is received after said first and second FSK signals.

2. An automatic frequency control system, as claimed in claim 1, wherein:
    said means for transmitting transmits in a packet mode in which the transmission of said FSK signal is of a predetermined duration.

3. An automatic frequency control system, as claimed in claim 1, wherein:
    said first and second FSK signals precede said FSK user data signal.

4. An automatic frequency control system, as claimed in claim 1, wherein:
    said first FSK signal is one of the following: a SPACE signal and a MARK signal, and said second FSK signal is one of the following: a MARK signal when said first FSK signal is a SPACE signal and a SPACE signal when said first FSK signal is a MARK signal.

5. An automatic frequency control system, as claimed in claim 1, wherein:
    said means for transmitting includes means for producing a carrier signal having a defined frequency and means for modulating said carrier signal to produce said FSK signal.

6. An automatic frequency control system, as claimed in claim 1, wherein:
    said means for receiving and using has a bandwidth that approaches the minimum bandwidth required for a given data transmission rate of said means for transmitting.

7. An automatic frequency control system, as claimed in claim 1, wherein:
    said means for receiving and using includes means for sampling-and-holding a first signal representative of the frequency of said first FSK signal and a second signal representative of the frequency of said second FSK signal.

8. An automatic frequency control system, as claimed in claim 7, wherein:
    said means for receiving and using includes means for using said first and second signals to determine an average signal and applying said average signal to said oscillator.

9. An automatic frequency control system, as claimed in claim 1, wherein:
    said means for receiving and using includes means for preventing the adjustment of the frequency of said signal produced by said oscillator if one of said first and second FSK signals are below a defined signal strength.

10. An automatic frequency control system, as claimed in claim 1, wherein:
    said signal output by said oscillator is used to make the initial conversion of FSK signals to a lower frequency following reception by said means for receiving and using.

11. An automatic frequency control system, as claimed in claim 1, wherein:
    said means for receiving includes a filter that has a center frequency of operation, wherein when said means for receiving is tuned, said FSK user data signal that is received after said first and second FSK signals is converted to a frequency spectrum that is substantially symmetrical about said center frequency of said filter.

12. A method of automatic frequency control for an FSK data transmission system, comprising:
    providing a transmitter;
    providing a receiver that includes an oscillator which provides a signal;
    transmitting, using said transmitter, an FSK signal that includes a first FSK signal that has a first frequency, a second FSK signal that has a second frequency which is different than said first frequency of said first FSK signal, and an FSK user data signal, wherein said first and second FSK signals are at predetermined locations in said FSK signal;
    receiving said FSK signal using said receiver, wherein said step of receiving includes mixing said FSK signal with said signal output by said oscillator to convert said FSK signal to a lower frequency spectrum; and
    using said first and second frequencies of said first and second FSK signals to adjust the frequency of said signal output by said oscillator to tune said receiver for said FSK user data signal that follows said first and second FSK signals.

13. A method, as claimed in claim 12, wherein:
said step of transmitting includes transmitting said FSK signal in a packet mode in which the transmission of said FSK signal is of a predetermined duration.

14. A method, as claimed in claim 12, wherein:
said step of transmitting said FSK signal includes transmitting said first and second FSK signals in a preamble that precedes said FSK user data signal.

15. A method, as claimed in claim 12, wherein:
said first FSK signal includes one of the following: a SPACE and a MARK, and said second FSK signal includes one of the following: a MARK when said first FSK signal includes a SPACE and a SPACE when said first FSK signal includes a MARK.

16. A method, as claimed in claim 12, wherein:
said step of transmitting includes producing a carrier signal and modulating said carrier signal to produce said first and second FSK signals.

17. A method, as claimed in claim 12, wherein:
said receiver has a bandwidth that approaches the minimum bandwidth necessary for a defined data transmission rate in the receiver.

18. A method, as claimed in claim 12, wherein:
said step of using includes sampling-and-holding a first sample signal representative of the frequency of said first FSK signal and a second sample signal representative of the frequency of said second FSK signal.

19. A method, as claimed in claim 18, wherein:
said step of using includes employing said first and second sample signals to produce a third signal that is an average of said first and second sample signals and applying said third signal to said oscillator to adjust the frequency of said signal output by said oscillator.

20. A method, as claimed in claim 12, wherein:
said step of using includes controlling the adjustment of the frequency of the signal output by said oscillator based on the signal strength of at least one of said first and second FSK signals.

21. An automatic frequency control system, as claimed in claim 12, wherein: p1 said receiver includes a filter that has a center frequency of operation, wherein, when said receiver is tuned during said step of using, said FSK user data signal that is received after said first and second FSK signals is converted to a frequency spectrum that is substantially symmetrical about said center frequency of said filter.

22. An automatic frequency control system for an FSK data transmission system comprising:
first means for transmitting an FSK signal that includes a first FSK signal, a second FSK signal that is different than said first FSK signal, and a third FSK signal for user data, wherein said first and second FSK signals are located in a preamble that precedes said third FSK signal; and second means for receiving said first FSK signal, said second FSK signal, and said third FSK signal and converting each of said first FSK signal, said second FSK signal and said third FSK signal to a different frequency, said means for receiving and converting includes a voltage-controlled-oscillator for outputting a signal having a frequency that is related to a control signal, a mixer for combining said signal output by said oscillator with said first FSK signal, said second FSK signal, and said third FSK signal to produce a fourth FSK signal, a fifth FSK signal, and a sixth FSK signal, respectively, with each having a different frequency than said first FSK signal, second FSK signal, and third FSK signal, means for providing a first signal that is representative of the frequency of said fourth FSK signal and a second signal that is representative of the frequency of said fifth FSK signal, means for sampling-and-holding said first signal representative of the frequency of said fourth FSK signal and said second signal representative of the frequency of said fifth FSK signal, and means for averaging said first signal that was sampled by said means for sampling-and-holding with said second signal that was sampled by said means for sampling-and-holding to produce said control signal that is used to adjust the frequency of said signal output by said oscillator, wherein adjustment of the frequency of said signal output by said oscillator tunes said second means for receiving for processing of said third FSK signal.

* * * * *